United States Patent
Hansen et al.

(10) Patent No.: US 7,301,307 B2
(45) Date of Patent: Nov. 27, 2007

(54) METHOD AND APPARATUS TO CHARGE A BATTERY USING DETERMINATION OF BATTERY LOAD CURRENT

(75) Inventors: Stig Rafn Hansen, Farum (DK); Emil Froding, Copenhagen (DK); Frank Jorgensen, Frederikssund (DK)

(73) Assignee: Nokia Corporation, Espoo (FI)

( * ) Notice: Subject to any disclaimer, the term of this patent is extended or adjusted under 35 U.S.C. 154(b) by 341 days.

(21) Appl. No.: 10/876,496

(22) Filed: Jun. 25, 2004

(65) Prior Publication Data

US 2005/0285568 A1     Dec. 29, 2005

(51) Int. Cl.
*H01M 10/46* (2006.01)
(52) U.S. Cl. .................................................. 320/139
(58) Field of Classification Search ................ 320/139, 320/141, 144, 145
See application file for complete search history.

(56) References Cited

U.S. PATENT DOCUMENTS

| | | | |
|---|---|---|---|
| 3,890,556 A | | 6/1975 | Melling et al. |
| 5,541,490 A | * | 7/1996 | Sengupta et al. ............ 320/160 |
| 5,786,682 A | * | 7/1998 | Aiken et al. ................. 320/136 |
| 5,838,141 A | * | 11/1998 | Sengupta et al. ............ 320/145 |
| 5,905,364 A | * | 5/1999 | Ookita .......................... 320/141 |
| 6,259,231 B1 | * | 7/2001 | Hansen ......................... 320/131 |
| 6,388,425 B1 | * | 5/2002 | Petrovic ....................... 320/130 |
| 6,498,460 B1 | * | 12/2002 | Atkinson ...................... 320/135 |
| 6,710,992 B2 | | 3/2004 | Pannwitz et al. .............. 361/90 |
| 2004/0000893 A1 | * | 1/2004 | Raichle et al. ............... 320/135 |
| 2005/0099162 A1 | * | 5/2005 | Ding ............................ 320/141 |

FOREIGN PATENT DOCUMENTS

EP     0158636 B1     10/1985

OTHER PUBLICATIONS

"Why PWM?", Feb. 19, 2000, pp. 1-2, Morningstar Corporation, internet www.morningstarcorp.com.
"Pulse Width Modulation", May 19, 2004, pp. 1-9, internet www.cpemma.co.uk/pwm.html.

* cited by examiner

*Primary Examiner*—Edward H Tso
(74) *Attorney, Agent, or Firm*—Harrington & Smith, PC

(57) ABSTRACT

By determining charging current $I_{char}$ and then subsequently utilising that determination of charging current $I_{char}$ in relation to battery current $I_{bat}$ and load current $I_{load}$ as a result of operation of a phone or other electronic device it is possible periodically to adjust the necessary charging current in order to operate the device in terms of recharging the battery to a target charging voltage, as well as providing adequate electrical current for operation of the associated phone or other electronic device.

28 Claims, 2 Drawing Sheets

METHOD AND APPARATUS TO CHARGE A BATTERY USING DETERMINATION OF BATTERY LOAD CURRENT

FIELD OF THE INVENTION

The present invention relates to battery charging methods and more particularly to such methods utilised with respect to batteries incorporated within portable hand-held devices such as mobile phones.

BACKGROUND OF THE INVENTION

An inherent requirement with a portable hand-held device such as a mobile phone is the inclusion of a battery of sufficient performance to achieve the necessary electrical power supply for roving operation of that portable hand-held device. An example of such a battery is a lithium ion battery. Lithium ion batteries are popular for handheld devices due to their high energy density. However, in order to reach their full capacity it is necessary to charge them up to a max voltage, typically 4.2V. If charged only up to say 4.0V the battery would only hold about 75% of its maximum capacity. However charging a lithium ion battery to higher that the max. voltage (4.2V) can be dangerous as this can result into overheating, swelling and short-circuiting of the battery.

Clearly, it is necessary to regularly re-charge the battery as fully but also as safely as possible. With hand-held devices it also is possible that the device is continued to be used whilst the charging operation is performed. In such circumstances while the battery is being charged it may also be providing a relatively high load current for device operation. This can create problems with respect to ensuring that the particular defined target voltage necessary in order to achieve a fully charged state can be maintained.

Previously, in order to attempt to achieve full charging, measurement of the non or minimal loaded open circuit battery voltage (OCV) has been achieved in order to adjust the defined target voltage necessary for a fully charged state. For practical and safety reasons the battery voltage is not measured directly at the battery tabs, but at a point in the power supply circuit where there would be some wiring and typically a safety circuit between the measuring point and the battery tabs. Unfortunately, the impedance between the battery terminals and the measuring point together with the load current will result in a voltage drop and therefore a lower measured open circuit battery voltage in comparison with the actual open circuit voltage for that battery. This difference between the measured and the actual open circuit voltage can be calculated using Ohm's law. In any event, it will be understood that a high load generally results in a high deviation between the measured open circuit voltage and the actual open circuit voltage for the battery. In such circumstances, previous battery charging arrangements generally ensure that full charging of the battery is postponed until the battery load current is low, that is to say the portable hand held device was not in operation. This may be inconvenient for the user.

SUMMARY OF THE INVENTION

In accordance with the present invention there is provided a battery charging method for a portable hand held device, the method comprising applying a charging current across a battery for charging of the battery to attain a charging voltage and determination of load current by periodic interruption in application of the charging current whereby the charging current for the battery is adjusted towards a defined target value for the charging voltage between determinations of the load current for sustained charging of the battery despite variation in load current requirements.

Generally, the adjustment towards the defined target value is for consistent battery charging irrespective of load current requirements up to a pre-determined limit.

Generally, the periodic interruption is in the order of every sixty seconds. Additionally, the interruption lasts for a time period of one second.

Normally, the method is only performed upon attainment of a minimum battery charge voltage by the battery.

Further in accordance with the present invention there is provided a battery charging apparatus comprising means to couple a battery to the apparatus, means to apply a charging current to the battery to achieve charging and means to determine load current by periodic interruption in the application of the charging current whereby the charging current is adjusted towards a defined target value for the charging voltage between determinations of the battery load current.

BRIEF DESCRIPTION OF THE DRAWINGS

An embodiment of the present invention will now be described by way of example and with reference to the accompanying drawings in which.

DETAILED DESCRIPTION OF THE INVENTION

Figure 1:
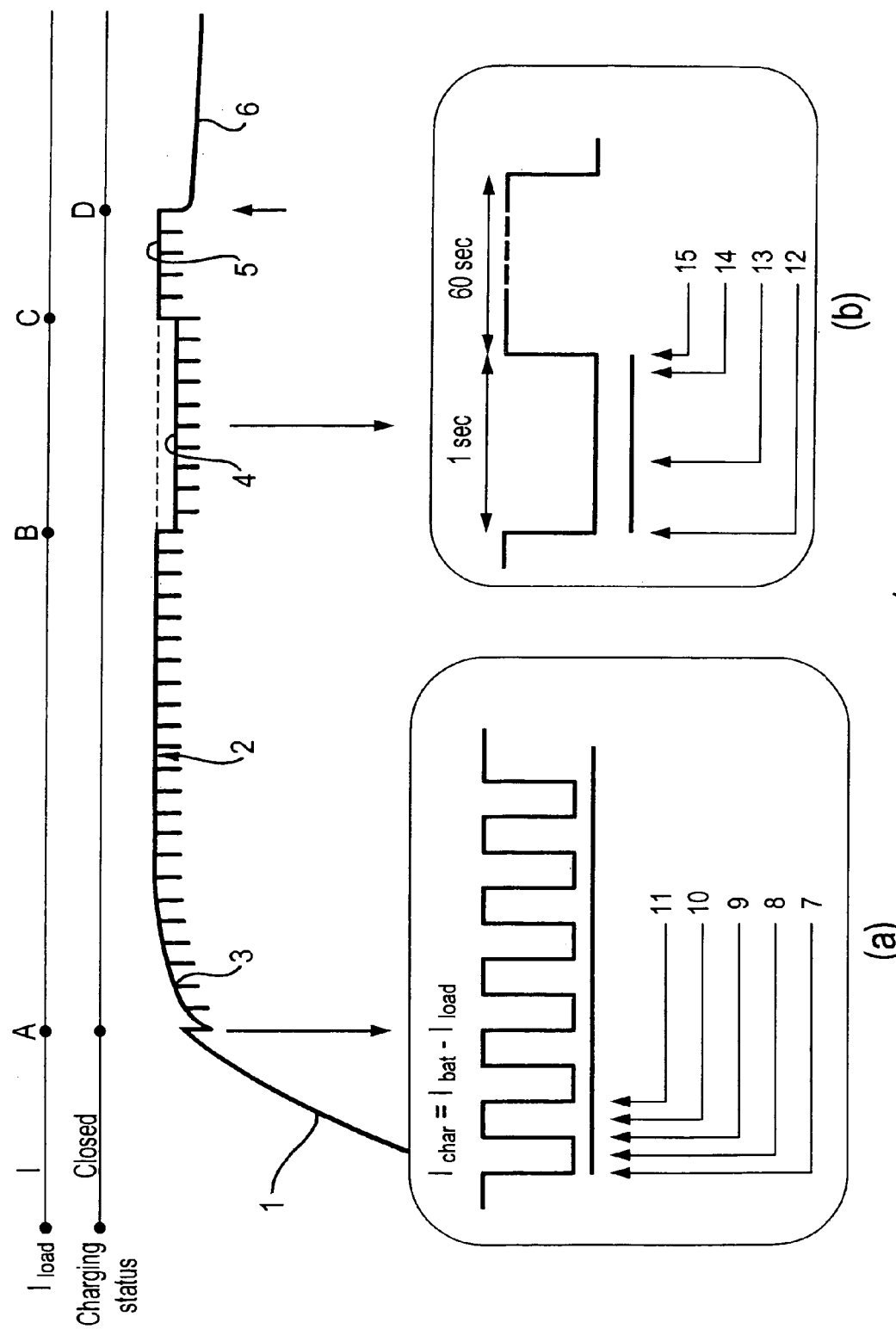
FIG. 1 is a schematic illustration illustrating load current and charging status as time lines with a graphic representation of charging voltage value relative to those time lines.

As indicated above, it is desirable to fully charge a battery without overcharging that battery which may create safety problems including excessive heat and/or explosion of the battery. Traditionally, moderation of battery charging has been achieved through use of sensors coupled to the battery through wires. Sensor wires are possibly attached directly to the battery and the impedance of the wires is not a problem, as there will be no significant current running through this wires. The sensor wires are however not desirable for various reasons; they add to the costs, they could create additional electrical signal noise and they could create a safety issue as they would bypass the safety circuit.

It will be appreciated that most battery charging methods and apparatus incorporate sufficient capacity to enable continued operation of the associated electronic device, e.g. a portable hand held device as well as charge the battery itself. What is required is adequate consideration as to the applied current across the battery despite variations in power supply required for ongoing operation for the hand held device itself in order to attach a target value for the battery charging voltage.

Clearly, a battery in situ with its electronic device incorporates appropriate wiring to couple that battery to the electronic device. The charging current is applied appropriately across this wiring.

By use of comparative techniques it is possible to arrange that the impedance load to the sensor is consistent for both comparisons and therefore should not introduce error. Thus, by appropriate separate determination of the battery current, that is to say the current through the battery as it is charged and the device load current across the battery, that is to say the operational load of the associated electronic device, is possible to more consistently ensure that the necessary battery target charging voltage is maintained across the battery for recharging of that battery. It will be understood that substantially the same wiring will be utilised in determination of the battery current and the device load current. Unfortunately, in order to determine the device load it is necessary to interrupt the charging current. In such circumstances, in accordance with the present invention, periodically, normally once every sixty seconds the charging current is switched out of charging the battery in order that a determination of load current can be made, and then through subsequent calculation the charging current for the necessary target charging voltage set for the subsequent period, that is to say sixty seconds.

Generally, in order to avoid heating problems it is common to use pulse wave modulated (PWM) charging regimes where the charging current is rapidly switched on and off during charging. The present invention will be consistent with that regime of charging.

It will be understood that the total charging current necessarily applied will be equivalent to the battery charging current minus the load current necessary to drive the electronic device. In such circumstances, it will be understood that the greater the load current, the greater the variation in the necessary charging current such that the battery will be fully recharged to the target charging voltage. Whether the battery is in series or in parallel with the load impedance that load impedance will clearly alter the presented impedance to the charging voltage and so alter the charging current passing through the battery in order to recharge it.

FIG. 1 is a schematic illustration illustrating load current $I_{load}$ and charging status as time lines with a graphic representation of charging battery voltage. Thus, as depicted typically a load current $I_{load}$ is presented in a regime such that in a closed circuit charge, the charging battery voltage 1 increases in accordance with the slope depicted as a result of voltage built up in the initial part of the charging (which could be a time period of ½ an hour of the battery).

In the period 1 the battery has a low "on" capacity and the battery voltage is below 4.0 Volt. Under these conditions the battery is charged with a maximum allowable current. This is a constant current charge (cc) phase, and the charging battery voltage will during the initial stages climb up to say 4 V hereafter the charge mode is changed at point A to OCV charge, where the charging current is modified to keep the battery voltage just below/on the target charging voltage. In period 4 the measured battery voltage drops because the applied load current $I_{load}$ is high (80 mA).

In such circumstances, during the constant current charging phase, the battery voltage 1 increases in accordance with the curve depicted and towards typically a target of 4 Volts as indicated previously. However, after point A the charging current is varied to achieve a more ideal target battery voltage 2 of 4.2 volts for maximum charging. Whilst charging, the load current $I_{load}$ will generally be from a hand held portable device. Thus, upon switching to an open circuit voltage charge at A, a relatively small load current $I_{load}$ in the order of 3 milliamps will be presented with the device at standby. At this stage, an adjusted charging current will be presented to the battery. Furthermore, there will again be a general initial ramp 3 to the charging voltage as the charging current is adjusted for optimising charging voltage. In this condition the battery will be normally charged near to its maximum charge capacity by activating a target battery voltage of 4.2 volts.

At the point B in the load current time line, an electronic device, which as indicated previously is typically a hand held portable device such as a phone, etc will be switched into main operation such that a greater load current in the order of 80 milliamps will be required to drive that hand held portable device. Operation of that hand held portable device will clearly proceed for a time period defined between switch on at point B and switch off at point C. During this period, as can be seen, there is a deterioration in the value of the charging battery voltage 4 presented to the battery. Subsequent to point C the greater load current is removed so that the charging current 5 again returns to substantially that of the free open circuit charging regime. Once the battery is fully charged it will be noted that a simple maintenance charge is maintained but no further substantive charging of the battery is achieved. This point is illustrated in FIG. 1 at point D with respect to charging status and by portion 6 of the battery voltage line. Clearly, if the switch status is returned to a closed circuit then the charging current from the battery charging apparatus would diminish in a downward slope if the battery is depleted by providing power to an electronic device or drift down as shown by portion 6 by satisfying standby load current demand.

It is adjustment of the charging current 4 to maintain the battery charging voltage target whilst the electronic device is utilising significant current which is at the core of the present invention.

Initially, during the early stages of open circuit voltage charging, that is to say in the portion 2, there is a determination as to the applied electrical charge current for attainment of the target charging voltage 2. As indicated, in an initial voltage target adjusting phase illustrated by portion 3, there is a variation in charging current. Thus, at least three identical charge current values I char must be determined for consistency before proceeding and throughout the charging process.

FIG. 1a illustrates a regime by which the charge current I char is determined. Thus, initially the charging switch, that is to say the switch coupling the battery charger apparatus and charge current to the battery is opened at 7 to interrupt such charging so the load current $I_{load}$ can be determined in the period 8. Once the load current $I_{load}$ has been determined the charger switch is then thrown to a closed position at point 9 whereupon the battery current $I_{bat}$ is determined in the time period 10. At the end of the time period 10 the switch is again opened at point 11 to allow a subsequent determination of the load current $I_{load}$. This is repeated until acceptably consistent and stable values are obtained. It will be appreciated that the charging current $I_{char}$ presented by the charging apparatus in accordance with the present invention is a simple summation of the battery current ($I_{bat}$) minus the load current ($I_{load}$) necessary to power the electronic device, such as a hand held portable device or mobile phone. As indicated previously, generally this load current ($I_{load}$) as a result of operation of the associated electronic device with the battery will be quite low when that device is substantially switched off or at standby so that the battery current will substantially equate to the charging current for that battery. This determination of the charging current will be made initially upon entry to a charging adjustment (after point A) mode and continuously determined throughout that continued charging period. The load current $I_{load}$ may vary and is determined periodically and typically with a time span between determinations in the order of 60 seconds. The battery current $I_{bat}$ is determined once every second.

FIG. 1b illustrates the regime with respect to determination of the load current $I_{load}$. Thus, the charging current is removed at point 12 by opening the charger switch, thus the load current $I_{load}$ can be determined during the period 13 when the charging current is removed. Towards the end of a set time period for determination of the load current, that is to say at point 14, the arrangement in accordance with the present invention sets the charging current $I_{char}$ necessary to achieve the target charging voltage from the determination of the battery current $I_{bat}$ and the load current $I_{load}$ currently prevailing at that time. Once the determination of the necessary charging current is calculated the charge switch is again closed at point 15 in order to apply the charging current $I_{char}$ and therefore achieve attainment of the battery charging target voltage for full or fuller charging of the battery. As indicated, this regime for determining the load current $I_{load}$ will generally be performed within a one second period whilst there will be a period in the order of sixty seconds between such determinations. However, the time period between determinations may be reduced or lengthened dependent upon expected use of the device utilising the load current. It will be understood with a sixty second span, a short telephone conversation may all occur within a sixty second time frame and therefore that variation in the load current $I_{load}$ will not be determined in the available time.

As indicated above, it is desirable to adjust the charging current as necessary for a target value for the charging voltage whereby the battery is fully recharged. Nevertheless, there may be exceptional high load periods when attempts to determine a suitable target voltage and so charging current would be distortative. Thus, when a load current in excess of say 250 mA is present, the target voltage will be set at a fixed level of say 4V for such short term heavy load current usage.

Figure 2:
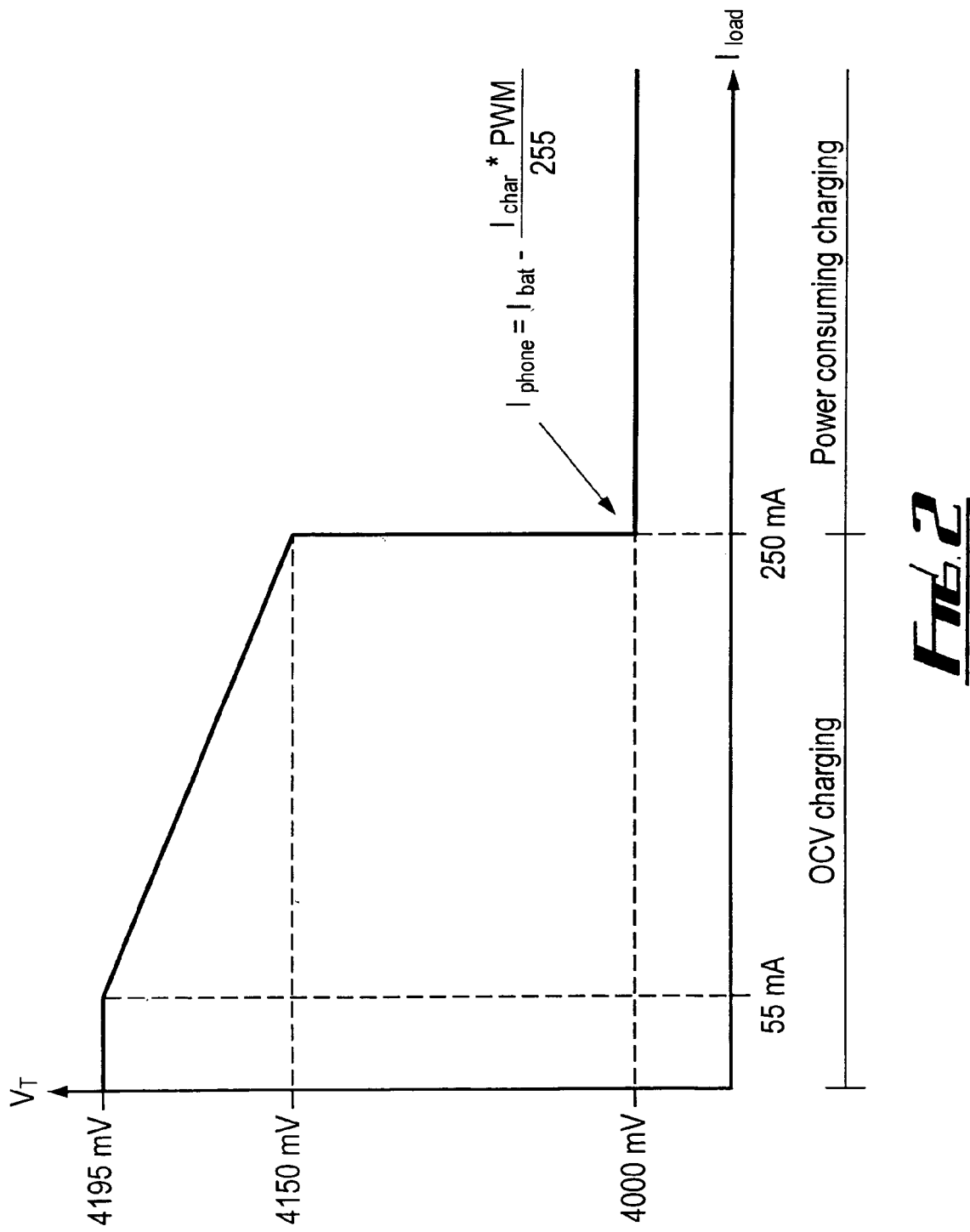
FIG. 2 is a graphic representation of a target voltage determination in terms of target voltage against load current.

FIG. 2 illustrates a target voltage determination in terms of target voltage against load current $I_{load}$. In such circumstances, typically a target voltage $V_T$ is provided in order to adequately recharge the battery. In the embodiment depicted in FIG. 2 that target voltage is determined by the relationship $$\text{Target voltage } V_T = 4195 \text{ millivolts} - (I_{load} + 20\%) \times R_{system}$$

with $R_{system}$ being the equivalent of impedance in the power lines as a result of sensing, contacts, safety fusing and other factors, that is to say between the measuring point and the battery terminals. Typically $R_{system}$ will be in the order of 150 milliohms. Thus, the representation depicted in FIG. 2 assumes the following:

| | |
|---|---|
| Electrical current limit for power consuming charging | 250 milliamps |
| Maximum open circuit voltage (no impedance) | 4230 millivolts |
| Maximum battery voltage error | 20 millivolts |
| Maximum battery current error | 20% or plus or minus 10 milliamps |
| Minimum battery current for charging | 55 milliamps |
| Maximum voltage charging error | 5 millivolts |
| R system | 150 milliohms |

In such circumstances, as can be seen the target voltage is in the order of 4195 millivolts at the minimum battery current Z of 55 milliamps. Between the minimum battery current and the maximum power consumption for determination, the target voltage $V_T$ is then given by the relationship outlined above, that is to say, target voltage $V_T$ is defined by $$V_T = 4195 \text{ millivolts} - (I_{load} + 20\%) \times R_{system}.$$

In these circumstances a target voltage $V_T$ in the range depicted by line 20 is set periodically by determination of $I_{load}$. This time period as indicated previously will generally be every sixty seconds. Furthermore, $I_{load}$ upon each determination will be found by the relationship $$I_{load} = I_{bat} - I_{charge}$$

where $I_{load}$ is taken as indicated previously upon initial charging and every sixty seconds thereafter when three identical values for $I_{charge}$ are determined whilst $I_{bat}$ will generally be determined regularly at one second intervals through appropriate sensing. By such an approach the target voltage $V_T$ can be determined to ensure, in the range 55 milliamps to 250 milliamps load current demand, that both charging of the battery as well as ongoing electronic device demand will be satisfied.

$I_{char}$ is normally applied by pulse wave modulation (PWM) whereby the charging current is pulsed so that the application factor is given by PWM/pulse period where PWM is the aggregate pulse number and the full duty cycle pulses per second in this example is 255. Thus, $I_{char}$ is normally moderated to give $I_{load} = I_{bat} - I_{char}$ (PWM/255).

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A battery charging method for a portable hand held device, the method comprising applying a charging current across a battery for charging of the battery to attain a charging voltage and determination of load current by periodic interruption in application of the charging current whereby the charging current for the battery is adjusted towards a defined target value for the charging voltage between determinations of the load current for sustained charging of the battery despite variation in load current requirements.

2. A method as claimed in claim 1 wherein the adjustment towards the defined target value is for consistent battery charging irrespective of load current requirements.

3. A method as claimed in claim 2 wherein charging voltage is maintained up to a pre-determined limit value for the load current.

4. A method as claimed in claim 1 wherein the periodic interruption is in the order of every sixty seconds.

5. A method as claimed in claim 1 wherein the interruption lasts for a time period of one second.

6. A method as claimed in claim 1 wherein the charging current is applied by pulse width modulation (PWM) of that current.

7. A method as claimed in claim 1 wherein the method is only performed upon attainment of a minimum battery charge voltage by the battery for subsequently further charging of the battery to a target value for the charging voltage.

8. A battery charging apparatus comprising means to couple a battery to the apparatus, means to apply a charging current to the battery to attach a charging voltage and means to determine load current by periodic interruption in the application of the charging voltage whereby the charging current is adjusted towards a defined target value for the charging voltage between determinations of the battery load current.

9. A method for charging a battery for a portable hand held device, the method comprising:

(a) applying a charging current to a battery;
(b) interrupting the charging current to determine a value for load current demand upon the battery; and
(c) applying an adjusted charging current to the battery, wherein the adjusted charging current is dependent upon the value of the load current demand upon the battery determined during interruption of the charging current.

10. A method as claimed in claim 1 wherein the method involves determining the presence of a minimum value of a charging voltage before further charging of the battery to a defined target value of the charging voltage by applying the adjusted charging current.

11. A method as claimed in claim 1 wherein each adjustment of the charging current is dependent upon an immediately previous determination of the load current upon the battery during an interruption.

12. A method as claimed in claim 1 wherein the adjustment of the charging current is dependent upon a number of previous determinations of load current demand upon the battery in respective interruptions in the charging current applied to the battery.

13. A method as claimed in claim 1 wherein the defined target value for the charging voltage is for a desired level of final charging of the battery.

14. A method as claimed in claim 13 wherein the desired level of final charging of the battery is for maximum capacity charging of the battery.

15. A battery charging apparatus comprising a coupler for coupling a battery to the apparatus, a charger for applying a charging current to a battery, a switch for interrupting the charging current applied to the battery, a sensor for determining a current load demand upon the battery during an interruption in the charging current and a controller for adjusting the charging current in dependence upon a determined current load demand.

16. An apparatus as claimed in claim 15 wherein the controller provides adjustment of the charging current for consistent battery charging irrespective of load current demand over a range of load current demand values by reference to a relationship between a charging voltage, the charging current and the load current demand on the battery stored in the controller.

17. An apparatus as claimed in claim 15 wherein the controller is arranged to limit the charging current to a maximum value so that a charging voltage is maintained up to a pre-determined limit value for the load current demand on the battery during charging of the battery by the charger.

18. An apparatus as claimed in claim 15 wherein the charger is arranged to apply the charging current to the battery by pulse width modulation (PWM) of the charging current applied to the battery.

19. An apparatus as claimed in claim 15 wherein the controller is associated with a charging voltage sensor and arranged to monitor the charging voltage sensor to determine attainment of a minimum charging voltage before the switch provides interruption in the application of the charging current to the battery in order to allow the sensor to determine load current and the controller to adjust the charging current provided by the charger.

20. An apparatus as claimed in claim 15 wherein the switch provides for periodic interruption of the charging current to the battery for determination of the load current demand upon the battery.

21. A method of charging a battery, the method comprising applying an input charging current to a battery, interrupting the input charging current to determine a load current output from the battery and controlling the input charging current in dependence upon the determined load current.

22. A method as claimed in claim 9 wherein each adjustment of the charging current is dependent upon an immediately previous determination of the load current upon the battery during an interruption.

23. A method as claimed in claim 9 wherein the adjustment of the charging current is dependent upon a number of previous determinations of load current demand upon the battery in respective interruptions in the charging current applied to the battery.

24. A method as claimed in claim 23 wherein the defined target value for the charging voltage is for a desired level of final charging of the battery.

25. A method as claimed in claim 24 wherein the desired level of final charging of the battery is for maximum capacity charging of the battery.

26. A method comprising:
(a) applying a charging current to a battery from which current is being drawn as a load current;
(b) interrupting the charging current to determine a value for load current demand upon the battery; and
(c) applying an adjusted charging current to the battery, wherein the adjusted charging current is dependent upon the value of the load current demand upon the battery determined during interruption of the charging current.

27. The apparatus of claim 15, wherein the sensor is additionally configured to detect a voltage at a point in a load current path that is separated from the battery by a known impedance value and wherein the controller is configured to adjust the charging current in dependence upon a target detected voltage determined using the known impedance value and the current load demand.

28. The method of claim 21, further comprising:
detecting a voltage at a point in a load current path that is separated from the battery by a known impedance value, wherein the input charging current is controlled by determining a target for the detected voltage using the known impedance value and the determined load current; and
adjusting the charging current in dependence upon the target.

* * * * *